United States Patent [19]

Blaser

[11] Patent Number: 5,041,070
[45] Date of Patent: Aug. 20, 1991

[54] INTERMITTENT WEB FEED APPARATUS

[75] Inventor: Giles R. Blaser, Green Bay, Wis.

[73] Assignee: Amplas, Inc., Green Bay, Wis.

[21] Appl. No.: 610,313

[22] Filed: Nov. 6, 1990

Related U.S. Application Data

[63] Continuation of Ser. No. 226,398, Jul. 29, 1988, abandoned.

[51] Int. Cl.$^5$ ............................................. B65H 43/00
[52] U.S. Cl. ........................................ 493/14; 493/18;
493/22; 493/24; 493/29; 493/30; 83/210;
83/365; 83/371; 226/27; 226/28
[58] Field of Search ................... 493/2, 8, 11, 13, 14,
493/15, 18, 22, 24, 25, 29, 30, 34, 194, 239;
83/110, 72, 210, 362, 363–365, 369, 371;
226/26–28

[56] References Cited

U.S. PATENT DOCUMENTS

| | | | |
|---|---|---|---|
| 2,321,647 | 6/1943 | Brougham | 493/11 |
| 3,967,518 | 7/1976 | Edwards | 83/210 |
| 4,216,705 | 8/1980 | Achelpohl | 493/22 |
| 4,380,446 | 4/1983 | Dickson | 493/11 |
| 4,737,904 | 4/1988 | Ominato | 83/72 |

Primary Examiner—Frederick R. Schmidt
Assistant Examiner—Jack Lavinder
Attorney, Agent, or Firm—Andrus, Sceales, Starke & Sawall

[57] ABSTRACT

A bag machine includes a programmed logic controller intermittently actuating a web feed draw roll motor for controlled web feed during the inoperative period of a cycled seal bar. The controller has separate inputs for the seal bar periods and a web length and establishes a control program of a preferred motion profile, with acceleration and deceleration of the fixed rolls to match the bag length to the available time using the total time available, with acceleration to a maximum and deceleration to reference, with or without a constant speed period. The bag length and time is monitored each machine cycle to calculate the next motion profile and permit changes in the bag length without machine shutdown. A programmed registered mode of control responds to a web mark spacing relative to the seal bar. In the registered mode, a photoscanner detects the mark during a constant speed web feed period prior to the end of the available time and actuates the web feed accordingly. If actual draw roll motion differs from the programmed motion profile, a fault signal may shutdown the machine. Manual control and inputs are provided for setup and for manual machine operations. The controller may vary the length of every other bag slightly to spaced hot seams from each other and permits stacking of the bags. A programmed reverse drive withdraws the web slightly from the seal bar to prevent sticking of the web to the seal bar.

26 Claims, 4 Drawing Sheets

INTERMITTENT WEB FEED APPARATUS

This is a continuation of application Ser. No. 07/226,398, filed July 29, 1988 now abandoned.

BACKGROUND OF THE PRESENT INVENTION

This invention relates to a web feed apparatus and particularly to web feed apparatus for intermittent moving of a web in a bag machine and the like.

In the formation of successive similar elements for a web structure from a web source, successive lengths of the material may be moved through a forming machine in a time stepped manner. For example, in a bag making machine, a web of indefinitive length is moved by appropriate feed rolls from a supply into a sealing and cutoff machine or apparatus. For example, U.S. Pat. No. 3,722,376 which issued Mar. 27, 1973 and U.S. Pat. No. 4,425,988 which issued Jan. 17, 1984 disclose bag making machines including a seal and cutoff unit with a reciprocating sealing bar. A web of indefinite length is passed from a supply beneath the sealing bar and a platen in the raised or open position, and then stopped. The bar moves down to seal and thermally sever the web and form a bag. The bag length is controlled by the length of web fed into the sealing and severing unit.

Various means for intermittent feeding of the web have been suggested.

The web feed apparatus generally includes feed rolls adapted to pressure engage the web and transport the web into and through the seal and severing bar apparatus. A drive unit provides for acceleration of the web for feeding of the web followed by a corresponding dwell period during which the seal bar unit is operative to seal and sever the web. The drive rolls are generally coupled through a clutch-brake system or mechanism to establish appropriate interrelated relation between the feed rolls and the other components of the bag making machine including the seal bar unit.

A harmonic drive system is used to control the intermittent motion of the indexing feed rolls and web in a bag machine. The drive establishes a sine wave motion to the input of a clutch-brake unit between a drive motor and the feed rolls. The harmonic drive system consists of a variable radius crank shaft which is connected to a gear rack engaged with a pinion gear. The pinion gear indirectly drives the input of the clutch-brake unit. The web movement and bag length is determined by the crank radius and is changed by changing the radius of the crank shaft through use of a bi-directional motor.

The web is moved by energizing the clutch during the positive half cycle of the sine wave. During the negative half cycle of the sine wave, the brake is energized. Sealing, cutting and other auxiliary functions are performed on the web with the feed rolls stationary. The clutch and brake switching must be done at the zero velocity cross-over points in the sine wave to eliminate shock loading of the machine and rapid wear of the clutch brake. The machine is therefore limited to a 180 degree clutch and feed cycle and a 180 degree brakework cycle.

A second system used on bag machines consists of a motor driven positive infinitely variable (PIV) drive driving the input shaft of a clutch-brake system at a constant speed. The clutch-brake system is electrically actuated to set either the clutch or the brake to alternately move the web or hold the web stationary. A cam, essentially a duplicate of the seal unit, actuates the clutch-brake systems, and can accommodate an unequal clutch-brake cycle because the clutch input shaft speed does not change during the machine cycle and engagement speed is always the same. However, the variable drive system is generally limited to reduced cycle rate machines and causes a more rapid wear of the clutch-brake system than the sine wave harmonic drive system. Bag length is changed by changing the output speed of the variable drive with a constant input. Thus, if machine cycle rate remains constant, the feed rolls rotate further during the same time period thus developing a longer bag.

SUMMARY OF THE PRESENT INVENTION

The present invention is particularly directed to a programmed logic controller for establishing intermittent drive of first and second web processing mechanisms, and particularly a web feed unit for establishing a controlled feeding of a web in time relation to but otherwise essentially independent of a web work unit, and particularly a seal unit. The present invention has been particularly applied to a bag making machine including an intermittent programmed drive apparatus operating a second mechanism such as draw rolls in the bag machine within the time cycle of a cyclically moving first mechanism, such as a seal bar unit. The invention is particularly disclosed in the bag making machine with the particular features and advantages resulting from the invention. The seal bar unit or mechanism has an inoperative period during which the second draw rolls operate. A sensor or monitor senses the inoperative period of the first mechanism. An input unit sets the required movement of the draw rolls from a reference position to produce the bag length and establishes accelerating of the drive means to a maximum drive speed and decelerating of said drive means from the maximum drive speed all within the inoperative period. The input means determines the total actuation of the second means during said period and thereby determining the total motion required to be established by the roll drive. A programmed controller or logic unit is connected to the inoperative period sensor and to the input unit to correspondingly determine the available time and the required output of the drive means and includes a processor to establish a motion profile with acceleration and deceleration of the drive means to essentially match the available time and thereby establish effective, efficient actuation of the drive means and the feed rolls within the total time available. The motion profile preferably includes acceleration to a maximum speed followed by deceleration to reference speed, and may include a constant speed between the periods of acceleration and deceleration.

The system of this invention sychronizes the index of a servo drive to the other functions of the machine and thereby combines the simplicity of operation of a mechanical machine with the reliability and versatility of an electronic servo drive machine.

Generally in accordance with the present invention, the logic controller is coupled to the drive motor for operating the feed roll units in appropriate timed relation to the operation of the bag forming machine line with controlled sensing to provide appropriate timed feeding of the web. The logic controller automatically determines optimum acceleration and deceleration of the feed rolls for feeding of the preselected adjustable length of the web to be fed into the seal bar unit using the total available time. The activation of the feed roll drive motor is determined by an appropriate sensor coupled to the seal bar unit to determine and establish the available time for feeding of the web with respect to the work unit.

The control unit preferably includes a momentary reverse drive of the feed rolls whenever the bag machine is stopped, the reverse drive may be used to positively separate the web from the seal bar unit and prevent sticking of the web to the seal bar unit.

More particularly, in a preferred and optimum construction of the present invention, the feed rolls are coupled to an A.C. servo drive motor for independent rotation of the feed or draw rolls. A programmed controller which is a microprocessor base logic control unit includes a programmed processor adapted to control the operation of the motor in accordance with a programmed acceleration and deceleration in response to appropriate input signals. The processor receives a start signal from the work or processing unit for initiation of the feed cycle. Thereafter, the feed cycle is automatically established and terminated. A suitable bag length input is provided such as an appropriate simple length input switch assembly, a computer input or the like which provides a binary signal to the controller. The operator sets the length of the bag desired. The program based on that length and the predetermined available feed time automatically determines the necessary and desirable motion profile including maximum acceleration and deceleration to provide rapid but smooth acceleration of the drive mechanism and the web and smooth deceleration to a final stop. The movement of the web is monitored by the controller and the demand signal modified if the profile is not followed. Thus, a closed loop drive is provided.

The program can incorporate other desired programmed movements. Thus, for example, the controller may include a registered mode and respond to a printed web having locating marks for spacing of the web in precise location relative to the seal bar unit. In this mode, a mark sensing unit such as a photoscanner detects the mark and establishes the final positioning in response to the output of the photoscanner. Fault detection units may be incorporated into the system. If the draw rolls do not follow the programmed profile within a selected tolerance, the fault condition may be indicated by any suitable device including shut-down of the bag machine. Continuous or jog modes may be permitted. Manual adjustment to the monitored times, motor drive characteristic and the like may be provided. If the cycle at the work station is changed because of a change, for example in seal requirements, the optimum and available move time correspondingly is set by moving a switch means, selecting one of a plurality of switches that define the limits of the new sealing cycle or the like. These and other setup functions are readily incorporated into the controller system.

The controller is also preferably programmed to permit automatically varying the length of each alternate bag by a slight amount. The bags as received from the seal bar can then be stacked essentially without welding of the heat formed seams to each other.

The desirable momentary reverse movement of the web may also be appropriately programmed to reverse the direction of the drive to withdraw the web slightly from the seal bar unit, in each cycle or after forming the last bag and thereby prevent sticking of the web to the seal bar unit and insure the removal of the web.

As noted the operator need not have any particular knowledge of the operating system as the only required activity is insertion of the desired bag length into the input length control unit.

The programmed web drive operating the feed rolls or the like is not confined to 180 degrees of the main shaft as in the harmonic drive system and functionaly similar to other variable drive systems.

BRIEF DESCRIPTION OF THE DRAWINGS

The drawings furnished herewith generally illustrate the best mode presently contemplated for the invention and are described hereinafter.

In the drawings.

DESCRIPTION OF THE ILLUSTRATED EMBODIMENT

Figure 1:
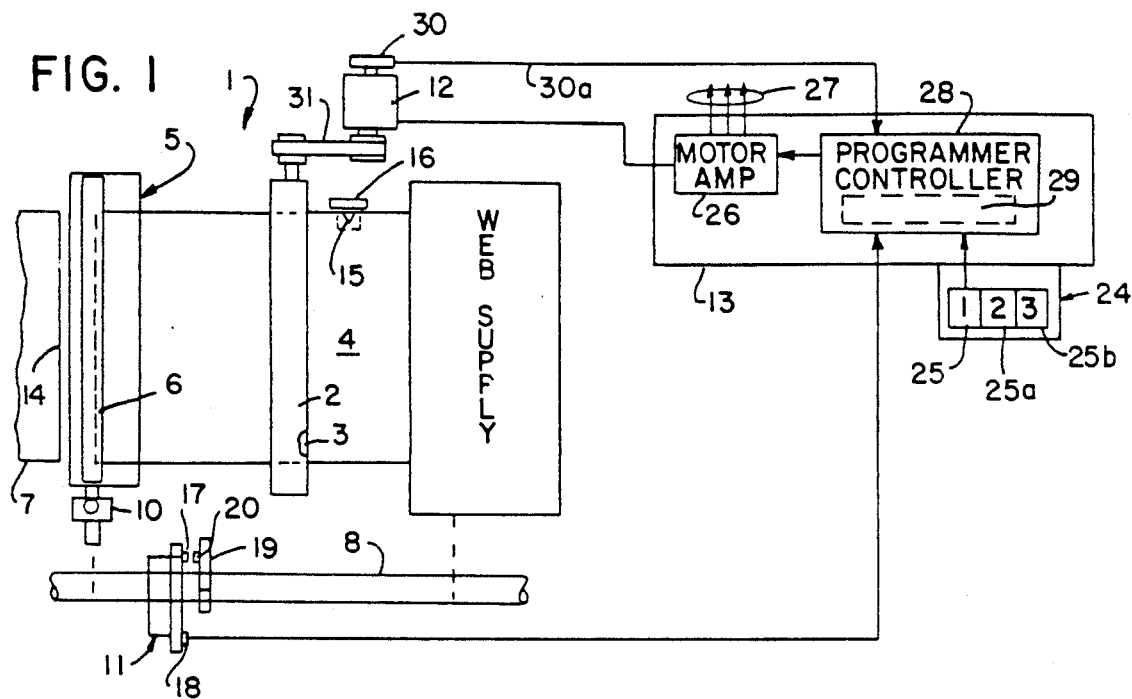
FIG. 1 is a simplified plan illustration of a bag making machine incorporating a web feed controller unit constructed in accordance with the teaching of the present invention.

Referring to the drawings and particularly to FIG. 1, a bag making machine 1 is diagrammatically illustrated. The machine 1 includes a pair of feed draw rolls 2 and 3 coupled to move a web 4 through the machine and particularly a seal bar unit 5 downstream of rolls 2 and 3. The bar unit 5 includes a heated sealing and severing bar 6 which extends across the complete width of the web and seals and severs the web 4 to form a bag 7. The web 4 is a folded sheet, subsequentially sealed along a side edge, or a flattened tube, such that the cross sealing and severing along predetermined spaced longitudinal lines forms individual bags. In accordance with conventional practice, the web 4 is fed intermittently through the bag machine with a short dwell period during which the seal bar unit 5 is actuated to seal and sever the web. The feed rolls 2 and 3 are rotated to advance the web 4 a distance equal to the length of the finished bag 7 between the operating period of the seal bar unit. The feed rolls 2 and 3 are thus intermittently rotated and form the driving force for moving of the web 4. Each bag forming cycle includes the alternate times for advancing the web 4 and for actuating the seal bar unit 5.

The seal bar of unit 5 is coupled to a continuously rotating machine main shaft 8. The coupling of the seal bar 6 to the shaft 8 includes a suitable cam unit 10, or other suitable mechanism to reciprocate the seal bar 6 between a raised standby position spaced from the web 4 and a lowered seal position engaging the web 4. The complete reciprocation of the seal bar 6 is affected within a portion of one revolution of the main shaft 8. Typically, the reciprocation and sealing of the web 4 will be accomplished in one-half revolution or less of the main shaft 8, with the remaining period available for rotation of the draw rolls. Rotation of the feed rolls 2 and 3 is sychronized with the movement of the seal bar 6 to move the web 4 only within the rest period of the seal bar 6, that is, with the seal bar 6 in the raised position. As more fully developed hereinafter, a seal bar position switch unit 11 is coupled to the shaft 8 and provides electrical signals to control rotation of a roll drive motor 12, for starting and stopping rotation of the rolls 2 and 3 by alternate energization of the motor.

In accordance with the present invention, the feed rolls 2 and 3 are coupled to a programmed drive control system or unit 13 including the draw roll drive motor 12 which is energized for the time period existing between the end of a sealing cycle and the beginning of the next sealing cycle as determined by the rotation of a main shaft 8 of the machine.

The web 4 may be a printed web in which the seal 14 is to be formed at a rather precise location of the seal 14 with respect to the printed matter. A mark 15 on the web 4 identifies such location and the feed roll drive is modified to respond to the location of the mark in accordance with the output of a mark sensing unit 16, such as a photoscanner.

Figure 2:
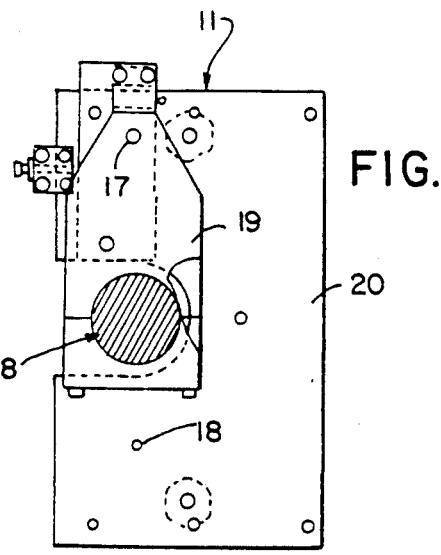
FIG. 2 is a view of a timing unit shown in FIG. 1.
Figure 3:
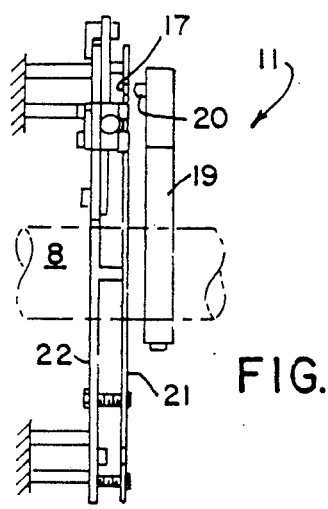
FIG. 3 is a side view of FIG. 2.

Referring particularly to FIGS. 2 and 3, switch unit 11 includes start and end cycle switches 17 and 18 which are coupled to the main shaft 8 as shown in FIGS. 1-3. The main shaft 8 is coupled to the seal bar cam unit 10, and the start and end cycle switches 17 and 18 are set to identify the beginning and the end of the seal bar sealing cycle. The switches 17 and 18 thereby provide corresponding inverse start and stop cycle available points in the machine cycle for the indexing of the feed rolls 2 and 3. In the illustrated embodiment of the invention, a rotating switch arm 19 is releasably secured to the main shaft 8 and rotates in sychronism therewith. An operating magnet 20 is secured to the outer end of the arm 19. The cycle switches 17 and 18 are secured to a timing circuit board 21 which is secured to a mounting plate 22, in turn, fixedly mounted to the machine frame. The circuit board 21 and the mounting plate 22 include corresponding and aligned edge recesses and the unit is mounted in telescoped relation over the shaft 8, as shown in FIG. 3. The cycle switches 17 and 18 are adjustably mounted on the timing board 21 in the circular path defined by the rotating magnet 20 on the end of the arm 19. The switches 17 and 18 are circumferentially spaced from each other in accordance with the beginning and end of the seal cycle and produce reference signals to the indexing apparatus and particularly the programmed drive system 12, and establishing the time available for rotation of the feed rolls 2 and 3. The shaft 8 rotates at the machine operating rate and the time of each revolution is correspondingly fixed. The time period within which the feed rolls 2 and 3 must be accelerated to a maximum speed and decelerated from such speed in moving the web 4 through the seal bar unit 5 to establish a precise bag length is fixed by the operation of the seal bar unit in accordance with usual practice.

The switches 17 and 18 may typically be Hall cell units. As the magnet 20 moves past the Hall cell units 17 and 18, the unit generates a sharp pulse signal suitable for processing by a conventional computer or processor. The switch units are shown spaced by 180 degrees and thus provide essentially equal half cycle periods for indexing of the web and actuating of the seal bar unit 5. Although the 180 degrees rotational period is often used based on prior systems, other periods may be used based on the time required by the particular seal unit, which may and often is less than the 180 degree time period. Generally, once the seal bar has been raised and the severed bag moved, the web feed may be initiated. If a known plurality of different cycle times are known, different control switches can of course be mounted to the timing board 21 and appropriately be connected in circuit to provide the desired modified signals to the indexing apparatus so as to permit use of the total available indexing time.

A visual readout dial unit, not shown, is secured to the main shaft 8 to provide referencing to the main shaft position for set up of the machine and the like, generally in accordance with conventional practice.

The length of web 4 fed to the seal bar unit 5 in the available time of the machine cycle is established by a length input unit 24 mounted as a part of the control and accessible to the machine operator. The illustrated input unit 24 is a three digit switch having 3 thumb wheels 25, 25a and 25b for manually setting of the bag length. Each wheel sets a switch unit, generating a digit related signal, which is sensed by the controller.

The two timed spaced signals of switches 17 and 18 determine one of the drive motors basic parameters, that is, time available to move the web 4 and switching unit 24 provide the desired length for producing a controlled acceleration of the motor from zero speed and back to a zero speed at the stop position. In the movement of the web 4, the feed rolls 2 and 3 desirably provide an appropriate rapid smooth acceleration to a maximum speed for moving of the web with minimum shock loading on the motor and drive apparatus as well as effective and reliable grasping and movement of the web. The deceleration of the motor is also preferably controlled to provide a corresponding effective and efficient slowdown of the web 4 with minimum shock loading and forces within the drive system.

In accordance with the preferred embodiment of the present invention, the control unit 13 includes a programmed controller having processor 29 programmed to detect the time spaced signals from the switches 17 and 18 of seal bar unit as feed limit signals, and knowing such available time, the length of the bag to be formed and the characteristics of the motor and drive system, a motor drive signal is created and connected to a motor drive amplifier 26 for connecting the roll drive motor 12 to an incoming power supply 27. The drive signal is translated by the amplifier 26 to establish a smooth and rapid movement of the web 4 using the total available time for moving of the web.

If the bag length is changed, the processor 29 merely recalculates the available time and adjusts the motor energization cycle and the draw roll movement accordingly with appropriate controlled acceleration and deceleration of the drive roll motor to maintain the effective and efficient movement of the web 4.

The bag length thus determines the required velocity of the movement of the web 4 during each web indexing cycle. The operator need only insert the proper bag length and the processor 29 proceeds to establish the proper motor drive signals. The processor 29 determines the necessary acceleration and deceleration characteristic in combination with the maximum motor speed for moving of the web 4 the preset length set into the thumb wheel unit 24.

A feedback signal unit such as a resolver or encoder 30 is coupled to the roll motor 12. The output of the resolver 30 is a distance feed back signal, corresponding to the movement of the web 4, to the processor 20 via signal line 30a to form a closed loop servo drive system. The processor can then monitor that the appropriate acceleration and deceleration characteristics are being followed to provide the precise movement of the web for the preset length of the bag.

As more fully developed hereinafter, the processor 29 is programmed to compute the parameters of the motor, including the acceleration, maximum speed and deceleration, just prior to the forming of each bag, and then executes that programmed move during the next cycle. This permits on-line variation in the bag length. Thus, with the machine running on-line, if the bag length should be changed, it is not necessary to shut down the machine or make any change, other than for the operator to properly change the bag length on the bag length input unit. The processor 29 will then automatically recalculate motor drive parameter to feed the appropriate web length into the seal bar unit 5 during the dwell cycle of the seal bar unit, using the complete available time.

More particularly, the feed or draw roll 2 motor is preferably a brushless AC servo motor such as widely used in industry. A typical motor would be a Model Max 112 available from Indramat. The output of the motor 2 is connected directly to the feed rolls by a drive belt 31. The encoder 30 is connected as an integrated part of the servo motor and provides a pulsed output signal identifying the position and number of revolutions of the servo motor and therefore the movement of the direct coupled feed rolls 2 and 3. As each revolution of the feed rolls provides for a predetermined movement of the web 4, the output of the encoder 30 provides a precise definition of the web movement, in accordance with the period of energization and rotation of the servo motor.

Figure 6:
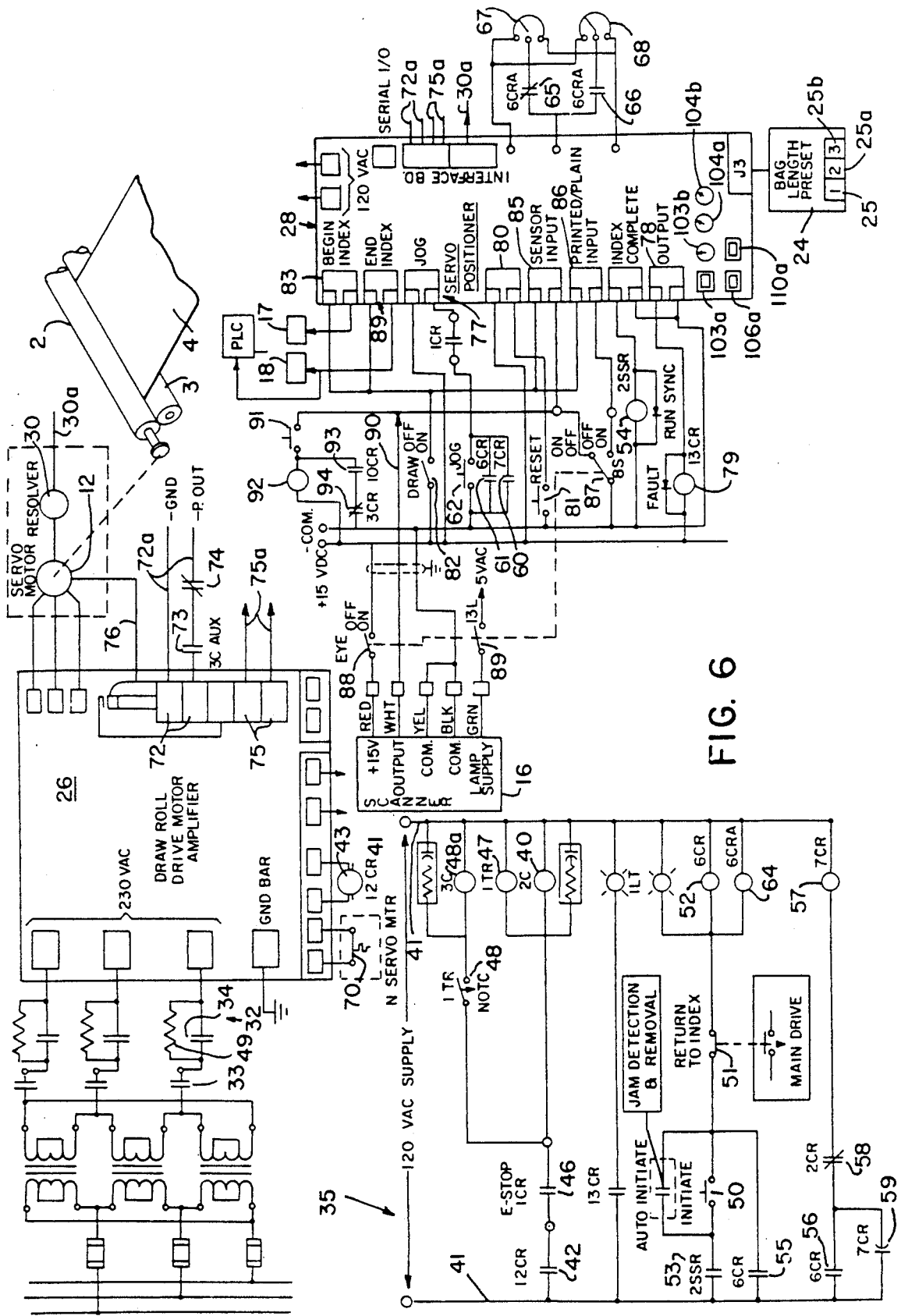
FIG. 6 is a schematic view of the drive control system including a microprocessor based logic controller for programmed energization of the feed drive rolls.

As shown in FIG. 6 and hereinafter described in more detail, draw roll amplifier 26 connects the motor 12 to the appropriate power supply 27 through a suitable contactor assembly 32 including main contactor contacts 33 and soft start contactor contacts 34. The amplifier 26 is coupled to the servo positioner programmed controller 28 which includes the suitable programmed processor 29 providing controlled and timed energization of the A.C. servo motor 12. A draw roll drive control circuit 35 is provided for operating of the motor contactors and operating of the feed rolls in the indexing mode, or alternately in a jog mode or continuous mode for threading the web in a stepped or continuous manner through the bag making machine. In the setup mode, the seal bar unit 5 and similar working apparatus is disabled.

The programmed controller 29 is provided with the initial position of the drive motor 12 identifying the location of the draw rolls 2 and 3 and the web 4. Each incremental movement of the motor 26 establishes a corresponding and related movement of the draw rolls 2 and 3 and the web 4. The acceleration control signal supplied to the amplifier 26 in essence demands that the motor 12 move at a predetermined rate and establish a continuous new position at said rate. The controller monitors the actual position established by the output of the resolver and compares it to that postion dictated by the command signal to determine if the acceleration characteristic has been followed. If the motor 12 has not followed that predetermined profile, the controller calculates and establishes a new demand signal to correct such deviation. Assuming the capability of the drive system to meet the demand, the motion profile should be quickly corrected and follow that dictated by the programmed profile to provide the efficient and effective movement of the web 4.

The programmed controller 28 thus develops a control signal to the motor drive amplifier 26 of a level to drive the motor 12 at an accelerating speed. The resolver 30 provides a feed back signal to the programmed controller 29. The rate at which the position changes is monitored by the programmed controller 29. If the position changes at the programmed rate, the signal is maintained and the motor 12 and draw rolls 2 and 3 continue to accelerate with an increasing smooth accelerated movement of the web 4 from the stop position into the seal bar unit 5. Generally, the motor 12 is preferably driven at a maximum rating to produce a most efficient movement of the bag web. When the web is moved a calculated distance, the programmed controller 28 establishes a deceleration cycle to gradually decrease the feed rate with the web 4 moved the desired length at or near the end of the draw roll available time.

Figure 4:
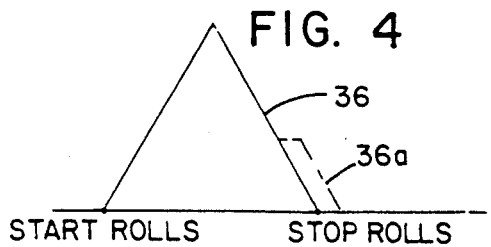
FIGS. 4 and 5 are graphical illustrations of motion profiles established by the controller unit illustrated in FIGS. 1-3.
Figure 5:
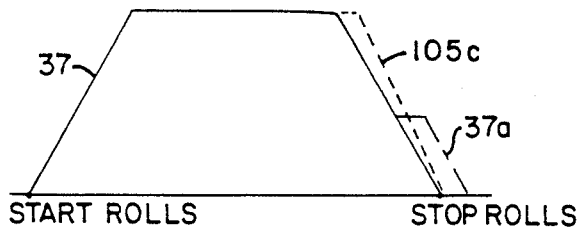

The motion profile is thus generally an inverted V-shaped configuration 36 such as shown in FIG. 4 which provides working of the motor drive system at the most efficient manner. With longer length bags and under certain conditions, a more truncated or trapezoidal shape motion profile 37 may be required, such as shown in FIG. 5. In the latter sequence, the programmed controller would cause the web 4 to move with an accelerated profile to a given level at which time the motor speed would be maintained constant for a predetermined period followed by an appropriate deceleration period to move the web within the available time between the operation of the seal bar. Further, with the photoscanner 16 activated, the deceleration profile is modified, as shown in phantom, as at 36a and 37a, to incorporate a constant speed search period and distance in which the motor drive responds to the output of the scanner to accurately position the web. The controller 29 is preferably provided with a potentiometer 37b to set the overdraw in the register mode.

The controller 28 is thus programmed to establish a predetermined motion profile over the period when the seal bar unit is raised and spaced from the web and platen. In the illustrated embodiment of the invention, the motion profile includes a constant acceleration and deceleration which preferably is established as the inverted V profile 36. Depending upon the particulars of the material, the available time, and the drive system, the motion profile 37 may include the connecting portion between the acceleration and deceleration portions of the profile, which would generally be a constant feed speed. Although the program controller 28 is not restricted in the motion profile which can be created, the constant acceleration and velocity characteristics are preferred. Further, the programmed controller is connected in a closed loop system and provides a continuous response to the actual position and the comparison to the programmed position created with the motor 12, and therefore the web 4 movement at the appropriate rate of acceleration. Any discrepancy, or lack of a match from the demand criteria, results in a further increase of the drive signal in an attempt to cause the motor to further accelerate or decelerate. If the controller continues to demand an increased change and such a change is not established in whole or in part, the controller is obviously making a demand which the motor drive system cannot produce. If the demand variation exceeds a preselected limit, the controller may actuate a fault output such as more fully disclosed hereinafter. Generally, the controller 28 establishes a desired profile and monitor the creation of such motion profile. Any deviation from the desired profile results in a modification of the drive signal in an attempt to establish the motion profile within the limits provided by the fault detection system.

In processing of a marked web 4, the photoscanner unit 16 is coupled to the web 4 upstream of the feed rolls 2 and 3 and provides a reference signal precisely identifying the movement of the mark 15 to the feed rolls. The output of the scanner 16 is connected to the servo positioner or programmed controller 28 to accurately locate the web 4 in accordance with the location of such mark. The scanner signal thus modifies the drive cycle for the motor 12 in relationship to the mark 15 during a search period as shown at 36a and 37a in FIGS. 4 and 5, to accurately and precisely position the web within the seal bar unit 5. The search period is shown as the preferred constant velocity movement, which may be at a relatively reduced velocity, and with a short final acceleration which is shown parallel to the basic programmed acceleration. The processor 29 thus adjusts the motor drive parameter such that programmed movement is completed using the totally available time for movement of the web 4.

During continuous sequential formation of bags, the plastic web 4 moves over the hot sealed bar unit 5. When the machine is shut down, such as at the end of a run or the like, the end of the incoming web 4 is aligned with and rests on the hot seal platen of the bar unit 5. The web 4 may rapidly weld to the platen even though the seal bar unit is de-energized. The welded end of web 4 must be removed from the hot seal bar unit 5 and the hot seal bar unit cleaned for subsequent processing of the web. In the illustrated embodiment of the invention, the controller 28 may be programmed to reverse the web drive, particularly at the end of the last programmed index cycle, as hereinafter described. Each execution of a cycle monitors whether or not the programmed controller has received a signal to shut-down, or to index the web 4 for forming another bag 7. The programmed controller may be programmed to complete the cycle for a last bag and in the absence of a new index pulse within the period of a reverse timer execute a web retract or reverse subroutine to drive the motor in the opposite direction and retract the web 4 from the seal bar unit 5.

More particularly, the draw roll drive control circuit 35 is shown in an across-the-line diagram. A main motor contactor relay 40 is connected to a main power supply lines 41 in series with a set of normally open contacts 42 of a motor amplifier stablizing relay 43. The relay 43 is shown connected to an output port of the motor amplifier 26. When the motor amplifier 26 is powered up from the controller, a predetermined time delay period is provided during the which the amplifier stabilizes and then an output of the output port energizes the relay 43 to close its contacts 42 and provide power to the contactor relay 40. The circuit is shown completed through a set of normally open contacts 46 of an emergency relay, not shown, which is connected to the main bag machine drive system and operated in any suitable manner in case of an emergency condition. It may for example be actuated through a manual input, not shown. A timing relay 47 is connected in parallel with the main contactor relay 40 and actuates a set of normally open contacts 48 which are time closed to actuate a relay 48a to actuate contacts 34. In start up, the main contactor contacts 33 close upon energization of relays 40 and 43 and provide power to amplifier 26 through a soft start resistor 49. The soft start contacts 34 subsequently close and provide the full power connected to amplifier 26.

A continuous run switch 50 is connected in series with a return to index switch unit 51 and a run relay 52 across the main power supply circuit. A set of sychronizing contacts 53 of a control sychronizing relay 54 are connected in the circuit to provide sychronization between the completion of an indexing cycle and conversion to a continuous run mode. The contacts 53 are normally open contacts and are closed only if the draw rolls are not moving indicating completion of an indexing cycle previously established. The continuous mode is therefore only established with the main indexing drive motor off. Energization of the run relay 52 closes a set of interlocking contacts about the sychronizing contacts 53 and the manual start switch 50. The relay 53 also closes a set of contacts 56 connected in circuit with a continuous mode relay 57 across the main incoming power lines of the control circuit. The circuit of continuous control mode relay 57 includes a set of normally closed contacts 58 coupled to the main bag drive machine for driving of the main shaft. Interlock contacts 59 are connected in parallel with the control relay contacts 56 and thus maintain the continuous mode until the machine contacts 58 open to reset relay 57. A second set of contacts 60 of the relay 57 and contacts 61 relay are connected in parallel with each other and a jog switch 62 to provide a control signal to the servo positioner or programmed controller 29 which establishes a continuous run signal to the amplifier 26 for establishing a continuous operation of the servo motor.

The jog switch 62 and the relay contacts 60 and 61 provide for applying a signal to establish the "jog" mode, or the "continuous-run" mode. The control relays of circuit 35 may include contacts connected in circuit with the bag machine main drive, as shown in block diagram.

A speed adjustment relay 64 is connected in parallel with the relay 52. Relay 64 controls a set of normally closed contacts 65 and a set of normally opened contacts 66 connected respectively to a jog speed control potentiometer 67 and a continuous run speed control potentiometer 68. The relay 64 is actuated with the run relay 52 and provides for disconnection of the jog potentiometer 67 and connection of the continuous run speed potentiometer 68 in circuit under continuous run mode, and otherwise maintains the jog speed control potentiometer 67 in circuit. The manually actuated jog switch 62 permits the usual stepped and controlled feeding of the web 4 through the machine.

The drive motor amplifier 26 is any suitable motor controller such as the motor amplifier manufactured and sold by Indramat of West Germany identified as a TVM/TOM model, with various models for operating at the appropriate current rating. The controller has a 230 volt AC input connected to a three phase power supply by the contactor assembly 32 and a 120 volt output for powering other parts of the apparatus. The amplifer 26 includes a motor temperature switch 70 to prevent continued operation of the apparatus if the temperature of the motor rises above an acceptable level. The internal stablizing relay 43 provides the output signal to the drive motor control circuit to insure stabilization and continued satisfactory operation of the motor amplifier during the bag machine operation. A bank of inputs includes a first set of input ports 72 connected to a logic and control power supply via connecting lines 72a. The logic power for supply amplifier 26 is derived from the servo positioner or controller 28. A set of contacts 73 of the relay 48a for contactor assembly 32 and a set of fault relay contacts 74 are connected in the circuit to control the powering of the amplifier. A second set of input ports 75 connect the motor amplifier 26 to the servo positioner or controller via lines 75a to receive the motor drive signal in accordance with the programmed profile for energization of the roll motor 12 and thereby for the controlled driving of the draw rolls 2 and 3 during the web feed cycle. The amplifier 26 translates the position control signal from the controller to motor drive signals for energizing of the AC servo motor 12 to sequentially accelerate the feed rolls, drive the feed rolls at a constant speed when programmed, and then decelerate the feed rolls to the stop position. A commutating feedback signal from the motor 12 to the amplifier 26 via a line 76 stablizes the motor operation. The web 4 is therefore gradually accelerated during an initial period, driven at the desired maximum speed permitted by the machine rate finally decelerated to zero speed in a gradual controlled manner to provide a smooth, accurate positioning of the web, and with the scanner search period included in the registered mode. The resolver 30 establishes a closed loop control system.

The programmed controller 28 is a computer or processor based unit and includes a plurality of different inputs and output ports for providing the various operating modes including a unique indexing mode. Generally, the several input and output control signals are connected to the controller through photo isolated plug-in devices shown as relatively square box-like units with the positive and negative inputs identifying by the numbers 5 and 6 respectively. The control input for the "continuous" and "jog" modes were previously described and are connected to an input unit 77. A fault control output unit 78 of the programmed controller is connected to a fault relay 79 which is activated when a fault condition is detected by the indexer control, For example, if the web position movement is less than a preset tolerance and does not respond to the increasing demand signal, relay 79 is energized. The relay 79 includes the contacts 74 connected in the logic power supply circuit lines 72a to the amplifier 26 and shuts down the drive in responding to a fault. When relay 79 is energized, the amplifier cannot be enabled and the draw rolls 2 and 3 can not operate to feed the web through the machine.

The programmed controller includes a fault reset unit 80 connected to the control signal voltage in series with a reset switch 81. Actuation of the reset switch 81 clears the indexer of the fault condition and resets relay 79. If the fault condition has not in fact disappeared, the indexer operation will again actuate the relay 79 and require subsequent maintenance and resetting.

A main off/on draw control switch 82 interconnects the logic voltage supply for the indexer to the logic power supply. When the switch 82 is closed, the various units directly related to the operation of the indexer are connected to the positive logic voltage supply, including the two main indexer part units 83 and 84 connected to the two cycle related switches 17 and 18, a photoscanner sensor input unit 85 is connected to respond to the output of the photoscanner 16 and plain web input unit 86 is connected to respond when the photoscanner 16 is not activated. The photoscanner 16 is connected into circuit through a single pole/double throw switch 87. The single pole/double throw switch connects the common or negative logic supply to either the sensor input unit 85 or the plain input unit 86 and thereby forces the system into one operating condition. The switch 87 is ganged with a scanner power switch including a supply switch 88 connecting the photoscanner to the logic voltage supply and a lamp switch 89 connecting the lamp, not shown, to an appropriate operating voltage supply. In the illustrated embodiment of the invention, a positive voltage is supplied to the photoscanner by the switch 88. The lamp supply for energizing of the lamp unit of the photoscanner is connected to a lower voltage supply via the switch 89. The output of the photoscanner is connected by a signal line 90 to the negative input of the sensor input unit unit 85. When the ganged switches are moved from the "off" to the "on" position, logic power is supplied to the photoscanner 16, and operatively to the associated lamp. Simultaneously, the switch 87 transfers the common ground signal line from the sensor input unit 85 to the plain input unit 86 and drives the system to introduce a slow speed search drive, and also releases the sensor input circuit 85 to respond to the output signal from the photoscanner transmitted via the signal line 90 and actuate the drive in the slow speed search drive as shown in FIGS. 4 and 5.

The signal line from switch 87 is also connected in circuit through a return-to-index reset switch 91 and a control signal relay 92. Switch 91 is used to establish the index mode of operation from a continuous run in the unprinted mode. Closing the reset switch 91 energizes relay 92, with the switch 87 in the scan-off position. The relay 92 is connected in a latched circuit through a set its own normally open contacts 93 and a set of contacts 94 of a main machine run control relay, not shown, associated with the bag machine. Contacts 94 are closed in the continuous run mode. When the index mode is set, the contacts 94 open and reset the relay, with the machine operating in the index mode.

Upon initial turn on of the bag machine, power is supplied to the programmed controller and establishes the indexing mode of operation with the draw switch 82 closed. The programmer 29 resets the various registers and timers as shown in the indexer software flow chart or drawings.

Figure 7B:
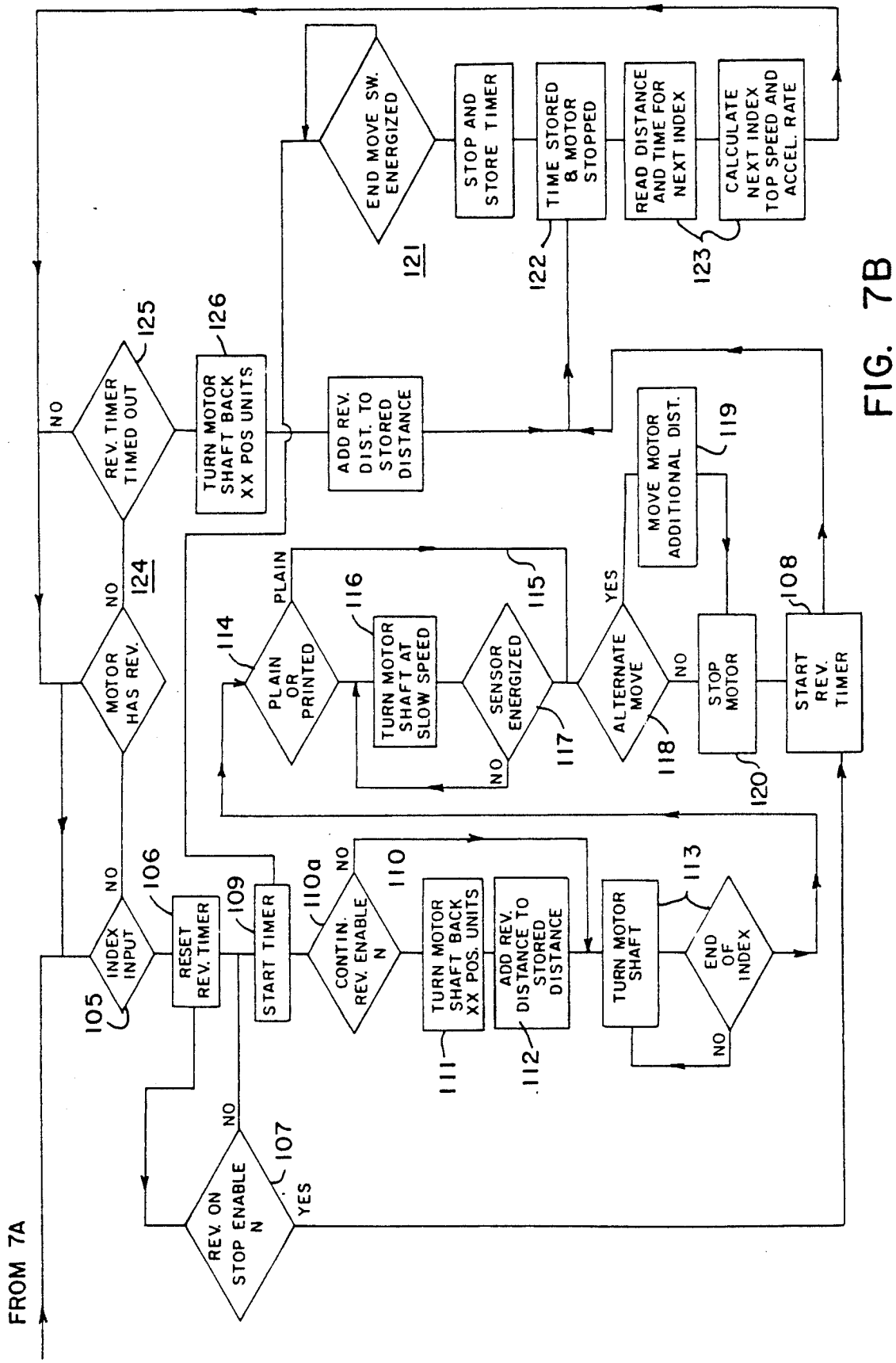
FIGS. 7A and 7B are a flow chart illustrating the software program and execution of the control shown in FIG. 6.
Figure 7A:
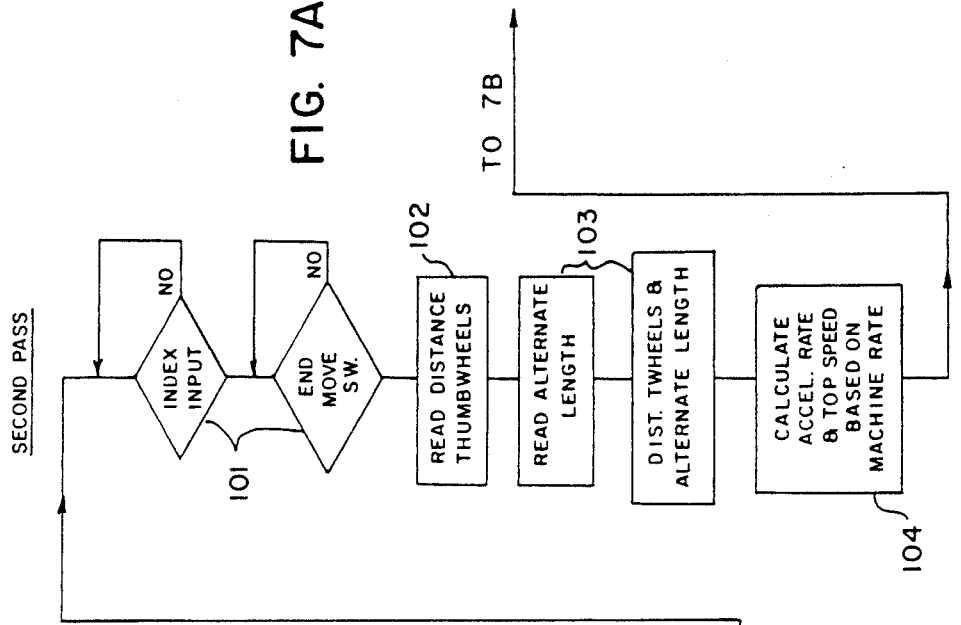

The processor executes the program as shown in FIGS. 7A and 7B and the necessary housekeeping to reset the distance and timer registers as shown at 95 for the calculation and control of the servo draw roll motor profile 36 or 37. A slight time delay is introduced into the execution after which the output position of the resolver 30 is read and stored in a register to establish the reference position from which the position signal of the resolver will be generated, as at 96. The controller 28 then transmitts the enabling signal to the enabling input of the power amplifier 26 and effectively turns the amplifier on, as shown at 96a. The processor 29 continuously monitors the index switches 17 and 18 coupled to the seal bar unit 5, as at 97. When an index start signal is received from the seal bar switch 17, the program starts operation of an available timer as at 98. The timer continues to operate until the end index switch 18 is actuated by the seal bar unit 5 and detected, as at 99. In response to detecting the end of cycle signal at 99, the available time for actuating of the draw roll motor to accelerate and move the web 4 is stored in a register and the maximum machine rate and move time is calculated and stored for moving of the web through the bag making machine, as at 100.

The programmed controller then waits for a second index cycle or pass during which the index input switch 17 and the end index switch are again monitored as at 101. When both of the switches have been actuated, the bag length is read from the thumb wheel switch unit 29. The program then reads the alternate length of alternate bags and the two lengths are stored as at 103. The alternate length corresponds to the slight additional desired movement of the web 4 for each alternate bag. The two lengths provide the desired alternate bags such that the bags can be stacked without superposing of the hot seal portions. The alternate bag length mode is selected in the machine set-up. In the illustrated embodiment, an alternate bag selection switch 103a is shown in FIG. 6 for manual setting of the programming, potentiometer 103b is also provided to permit varying of alternate length.

The programmed controller 28 and particularly processor 29 then calculates the acceleration and deceleration rates as well as a top speed of the draw rolls 2 and 3, and therefore the web, based on the machine rate as previously calculated in the first pass and the total distance of web traveled for the inserted bag length as at 104. The program then includes all of the necessary information with respect to the movement characteristic of the draw rolls and the servo motor 26, including a preferred acceleration characteristic, maximum operating speed and the like to create the motion profiles such as shown in FIGS. 4 and 5. The acceleration and deceleration generally follow similar slopes. Under certain conditions, the deceleration slope or characteristic may by desirably initiated at a somewhat different time or position with a corresponding change in the deceleration. Potentiometers 104a and 104b are shown in FIG. 6 which permit moving of the initiation of the deceleration period as shown in FIG. 5 at 105c.

The program as described requires two initial dry runs, that is, without forming a bag to develop the motor drive program for forming a bag. During the second pass, the controller is executing the first pass program for the next bag to be formed. As hereinafter described, when executing the program to form each bag, a second pass program is executed for the second or next bag to be formed and a first pass program is executed for the third or the next following bag to be formed.

The programmed controller 28 and particularly processor 29 executes the specific program for indexing the motor 12 and rolls 2 and 3 to move the web and form the bags on the next indexing start signal, and thereafter produces bags in a continuous sequence. A typical program is shown in the program listing filed herewith. The flow chart includes web withdrawal sequences which although not a part of the submitted program can be provided in accordance with the flow chart.

The program processor thus waits for the next index input or start signal from the seal bar switch 17, as shown at 105.

When the next index input signal is received, the program provides for resetting of a reverse timer 106. The drive as previously noted may provide a controlled reverse movement of the web 4 to space the web from the heat seal bar unit 5 at the last cycle in a run or the like. A manual selection switch 106a is shown in FIG. 6 to enable or disenable the reverse cycle program. The program, as shown in FIG. 7A and 7B, includes the decision step 107 which reads the setting of the switch 106a. If the reverse switch is not enabled or bypassed, the program steps immediately back to the cycle indexing. Of course, the cycle indexing is also completed if the switch 106a is enabled. However, if the reverse switch is enabled, an enable signal is impressed on and enables the reverse timer as shown at 108 to establish a subsequent reverse drive timing cycle. This reverse cycle output is subsequently incorporated into a separate sub-routine executed at the end of an index cycle to reverse the motor drive and withdraw the web 4 from the seal unit 5 as hereinafter described.

The index program in response to the index start signal in addition to resetting the timer at 106 essentially instantaneously starts a cycle timer as at 109 which times the third or following bag cycle. After the timer is started, processor stems to the next program step which in the illustrated embodiment includes a continuing web reverse subroutine 110 selectively mounted via a switch 110a shown in FIG. 6. If the processor 29 reads switch 110a as inserting the routine, the motor is energized to reverse the motor 12 a preset distance and thereby withdraw the web as at 111. The reverse distance is added to the stored distance as at 112 and the drive signal is transmitted to amplifier 26 to drive the motor 12 in accordance with the programmed profile. Thus, in the illustrated embodiment, the withdrawal is made at the beginning of the indexed, which for all practical purposes is essentially the same as the end of a last bag forming cycle. Thus, indexing may start when the seal bar is lifted. If the continuous reversal was not enabled, the program bypasses the reversing sequence and directly steps to drive the motor in accordance with the calculated programmed profile. The drive signal is thus transmitted to the motor amplifier 26 which translates the signal from the indexer to an appropriate related motor drive signal, and particularly provide a controlled acceleration of the motor 12 to the maximum speed based on the machine rate. The amplifier translates the position signal from the programmed controller particularly to a high level output required to drive the motor and the feed rolls 2 and 3. This drive continues until the end programmed profile, as shown at 113.

During the motor drive period, the resolver 30 generates a continuous position related feedback signal which is fed back to the indexer processor 29 based on the phase relationship of the two input sine wave signals to insure the following of the programmed profile.

The motor is driven until the end of the index cycle as established by the processor based on the available time and the particular setting of the several modifying and control inputs. The programmed controller particularly steps the programmed decision step to determine whether or not the web 4 includes a print mark and the photoscanner 16 is active, as at 114. If not, the plain print input unit 86 removes the mark search period and automatically moves the program forward as at 115.

If in fact the photoscanner 16 is connected into circuit, the processor plain web port 86 and the sensor input unit 85 is operative in the programmed controller to force the program into the mark search mode. The program executes the print mode to provide a slow speed signal to the motor amplifier 26 for slow speed turning of the motor 12 as shown at 116 until the scanner 16 generates an output signal to the sensor input unit 85. When the scanner 16 generates the alignment signal, the processor 29 detects the signal as at 117 and the program steps to the alternative bag length move program sequence.

The alternate bag length program, incorporated for each alternate bag formed, provides for a fixed forward movement. The programmed controller checks the state of the alternate move switch at 18 and, if actuated, energizes the motor for that particular additional distance as at 119 for the alternate bag and then stops the motor as at 120. Where the alternate move is not executed, the programmed controller steps immediately to stop the motor stop function 120, thereby ends the basic index cycle. As previously described, the timer 109 was enabled after the resetting of the reverse timer. The timer continues to time until the stop index switch 18 is actuated at which time, the timing is stopped and the tire recorded, as at 121.

This establishes the end of the cycle as at 122 unless the reverse subroutine is required.

At the end of the cycle, the program controller proceeds to read the distance and time for the next index and based on the setting of the timer 109 which reflects the initial two passes and times stored at 100, and based on the setting of switch assembly 24 calculates the next index motion profile parameters with the acceleration rate and top speed based on the machine rate, as at 123. If this is the last bag formed, the reverse drive subroutine 124 is executed to reverse the motor rotation and withdraw the web 4 slightly from the seal bar unit 5 so as to prevent welding of the web 4 end to the seal bar platen of unit 5. The subroutine 124 is a continuously monitored subloop. If an index signal is received, the reverse timer is reset and cannot time out and as set at the decision step 125, the monitoring of routinal 124 continues. If the timer has not timed out, the reverse motor drive is created for fixed time and distance move as at 126 during which time the motor reverses drive rolls 2 and 3 a predetermined number of revolutions and stops. The distance moved and the motor position is stored in the program at 122 for initiating the first indexing cycle. Thus, upon start up, the web 4 must be moved the bag length distance as set by the bag length input unit 24 plus the additional length created by the web withdrawal.

When the next index cycle is generated by the rotating arm actuating of the start switch 17 at the end of a seal bar cycles, the index moves the web to compensate for the withdrawn length.

By recalculating of the index movement during each operation of the seal bar unit 5 and prior to the next index cycle, the operator can change the system on-line. The thumb wheel switches 25a–25c are reset and thereby change the particular programmed length of the web fed through the seal bar unit for changing the bag length. The programmed controller appropriately recalculates the proper motion profile for that new length and proceeds to execute the same at the next cycle of switches.

The control system provides for on-the-fly variation in machine speed. The cycle time is based on the prior cycle operation of shaft driven switches 17 and 18, and a timing error may be created in one or two bags if the machine speed is increased. Thus, the seal bar 6 may be moved into engagement with the web while the web is still moving into the seal bar unit 5.

If the machine speed is decreased, the bag machine cycle is increased and the available time during a given cycle is increased. The next web movement has a greater available time and will provide appropriate location of the web with respect to the seal bar unit 5. The system can thus appropriately and properly locate the web at slower speed. If however, the machine speed is accelerated, the available time for moving of the web 4 is reduced from that programmed in the previous cycle sequence. Consequently, relying solely on the switches 17 and 18, the seal bar 6 may be actuated prematurely to drop the seal bar 6 into sealing relation, and somewhat prior to the actual movement of the web to the desired position.

Figure 8:
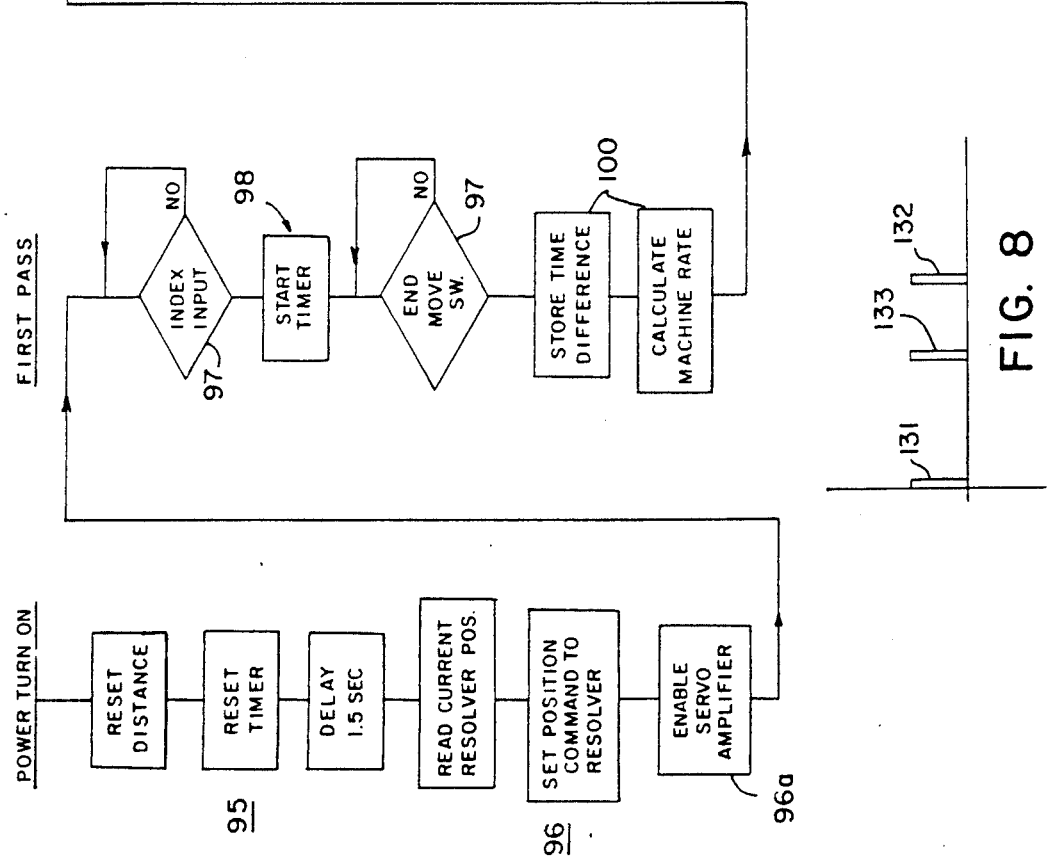
FIG. 8 is a timing chart illustrating a timing sequence to maintain optimum machine operation with changes in machine speed.

A simple and reliable modification to the system which has been used to compensate for changes in the machine speed is a switch unit 130, shown as a programmable logic unit (PLC), connected in parallel with the timing switch 18 which is operable under all speeds below a certain level, as shown in FIG. 6. The switch 130 provides a signal shortly prior to the signal established by the index cycle switch 18 during slow speed operation and prior to a corresponding signal, as shown in FIG. 8. The start cycle signal is shown at 131 and the stop cycle signal established by switch unit 18 at 132. The PLC 130 establishes an end cycle time signal 133. As the speed increases, the machine generated signal 132 is established with and then prior to signal 133. The processor 29 of programmable controller 28 responds to the first of the end cycle pulses or signals 132 and 133. With a change of speed of the bag machine, the fixed timing switch 133 establishes and maintains an essentially proper sequence of bag formation without disruption or adversely affecting the character of the bags being formed. The processor reads the index switches 17 and 18 during the following cycles and the system operates in the manner previously described.

The apparatus will thus continue to recycle forming of a series of bags of a given length determined by the control of the operator.

If the bag machine speed is changed during the operation of the bag machine, the time interval between the pulses from the cycle switches will of course change. The programmed controller automatically recalculates the drive of the motor with the proper motion profile to appropriate transfer and move the web based on this new time and in such a manner as to essentially use the entire available time to make the move.

As previously noted, the apparatus can be run in a continuous mode for various purposes. The system can of course also provide for a continuous speed mode in combination with an automatic transfer to an indexing mode. For example, with print marked web, the circuit would provide a suitable signal means to automatically actuate the return-to-indexing switching circuitry directly or through an alternate parallel circuit to initiate indexing in sychronization with the next registered mark on the printed web.

The various interrelated controls including for protection and the like are those desirably provided in a bag making machine.

A software program is submitted herewith for incorporation into the file wrapper for carrying out the machine operation as described in connection with the illustrated embodiment.

Various modes of carrying out the invention are contemplated as being within the scope of the following claims particularly pointing out and distinctly claiming the subject matter which is regarded as the invention.

I claim:

1. A web sealing apparatus having an intermittent web feed unit for intermittently feeding a web into a seal unit and holding said web stationary during the actuation of said seal unit, comprising cycle means for periodically actuating of said seal unit including an operative period during which said seal unit is actuated to engage said web and an inoperative period during which said seal unit is spaced from said web and establishes an available time of an indexing cycle for movement of the web through said seal unit, wherein said cycle means comprises a machine cycle means operative in timed relation to the seal unit and the web feed unit to establish successive machine cycles, a machine cycle reference means coupled to said machine cycle means and establishing reference signals related to the operative and inoperative periods of the seal unit, a servo motor means coupled to said feed unit, a feedback signal means coupled to said servo motor means establishing an output signal corresponding to the position of said motor means, web length means providing a feed output signal proportional to the length of web to be fed through said seal unit during said inoperative period, a controller including a processor having an operative program operable to read said machine cycle reference means and determine the available time of said inoperative period and read said web length means and determine the length of the web to be fed through said seal unit during said available time and calculate a profile program producing a profile signal for energization of said motor means including controlled acceleration to a top speed and a controlled deceleration from said top speed whereby said web is moved through said machine within said available time.

2. The apparatus of claim 1 for forming bags and wherein said processor reads and stores a first time of the work time for a first bag in a first machine cycle and the time for each succeeding bag in each succeeding machine cycle, said processor processing said first time and the bag length during said immediately succeeding machine cycle following said first machine cycle for developing the profile program for forming said first bag in the indexing cycle of said immediately succeeding machine cycle following the first immediately succeeding machine cycle, and for developing the profile program for forming immediately following bags in succeeding machine cycles immediately following the cycle during which the work time for the bag has been read and stored.

3. The control of claim 2 wherein said web feed unit includes draw feed rolls and said processor is programmed to calculate and establish a drive profile program prior to each actuation of said draw feed rolls whereby said length can be varied without shut down of the apparatus.

4. The apparatus of claim 2 wherein said processor includes a reverse web feed sub-routine for reverse driving of the web and for adding the reverse movement to said profile program for the next bag cycle.

5. The apparatus of claim 1 wherein each length in said web includes similar marks for positioning of said web with respect to said seal unit, and said apparatus includes means for detecting the movement of said marks relative to said feed unit to locate the web mark relative to said seal unit.

6. The apparatus of claim 1 wherein said processor is programmed to reduce the speed of the motor during the location of the marks relative to said seal unit.

7. The web processing apparatus of claim 1 wherein said machine cycle reference means includes a rotating means operating in timed relation to the seal unit and the feed unit and establishing a machine cycle during each revolution of said rotating means, first and second signal means mounted adjacent said rotating means and coupled thereto during each revolution thereof, said signal means being circumferentially spaced for actuation in sychronism with the initiation of the movement of the seal unit and in sychronism with the termination of the movement of said seal unit and thereby establishing said reference signals.

8. The apparatus of claim 7 wherein said motor means is a brushless commutating servo motor direct coupled to said feed unit, a servo amplifier connects said motor to a power supply and including a feedback signal for establishing stablized motor commutation.

9. The apparatus of claim 8 wherein said feedback signal means includes an encoding means coupled to said motor and establishing an electrical output signal corresponding to the position of said motor.

10. The apparatus of claim 1 wherein said web length means includes a switch means for providing an electrical output signal proportional to the length of web to be fed through.

11. The apparatus of claim 1 including programmed means to slightly change the length of every other feed movement of said web from the length of web established by said web length means.

12. The apparatus of claim 1 wherein said controller includes a fault detection means monitoring a variation between said programmed motion profile and said actual motion profile during the movement of said web and establishing an output signal in the presence of a preselected variation.

13. The apparatus of claim 12 wherein said motor means is a brushless commutating servo motor directly coupled to said feed unit, a servo amplifier connects said motor to a power supply and including a feedback signal for establishing stablized motor commutation, including means responsive to said output signal of said fault detection means to disable said servo amplifier.

14. The apparatus of claim 1 including a pulse signal source establishing a pulse train having a fixed pulse rate and connected to establish an end cycle signal prior to a reference signal related to said inoperative period from said machine cycle reference means with said web feed operating at a selected low feed speed.

15. The apparatus of claim 1 wherein said processor in response to a cycle of said cycle means for forming a final bag enters a reverse motor drive sub-routine for reverse driving of the motor to a selective offset in the length of the bag, said sub-routine transmits a signal to a reverse timer and establishes a signal to operate the motor in a reverse direction, said sub-routine measuring the offset and recording the offset and thereafter re-executing the profile program for the next cycle to add the offset to the length stored for the immediately following cycle of said cycle means.

16. A web processing apparatus comprising a seal bar unit, cycle means for periodically actuating said seal bar unit including an operating period during which said seal bar unit is actuated to engage said web and a dwell period during which said seal bar unit is spaced from said web and defining an available time of an indexing cycle for movement of the web through said seal bar unit, draw feed roll units coupled to said web for moving said web relative to said seal bar unit, rotating shaft means operating in timed relation to the seal bar unit and the draw roll units and establishing a machine cycle during each revolution of said rotating shaft means, a switch actuator coupled to and rotated by said shaft means, first and second switch means mounted adjacent said switch actuator and coupled thereto during each revolution of said shaft means, said first and second switch means being circumferentially spaced for actuation in synchronism with the movement of the seal bar unit at the beginning of said operating period and in synchronism with the ending of said operating period and thereby establishing reference signals related to the operating period of the seal bar unit and the dwell period of said seal bar unit, a servo motor directly coupled to said draw feed roll units, a feedback means coupled to said motor and establishing an electrical output signal corresponding to the position of said motor, a web length input for providing an electrical output signal proportional to the length of web to be fed through said seal bar unit during said dwell period to form a bag, a position controller including a processor having an operating program operable to read said switches and determine the available time of said dwell period and read said length input to determine the length of web to be fed through said seal bar unit during said available time and calculate a motion profile signal for energization of said motor including a controlled acceleration to a top speed and a controlled deceleration from said top speed whereby said web is moved through said machine within said available time.

17. The apparatus of claim 16 wherein said processor is programmed to calculate and establish a drive program prior to each actuation of said draw feed roll units whereby said length can be varied without shut down of the apparatus.

18. The apparatus of claim 16 wherein said processor reads and stores the time in one machine cycle and the distance in the next machine cycle for developing the profile program for the next indexing cycle.

19. The apparatus of claim 16 wherein said web includes control marks for positioning of said web with respect to said seal bar unit, and said apparatus includes a scanner for detecting the movement of said mark relative to said feed roll units, said processor being programmed to reduce the speed of the motor during the deceleration and to respond to said marks and output of said scanner to locate the web.

20. The apparatus of claim 16 wherein said motor is a brushless commutating motor, a servo amplifier connecting said motor to a power supply, and said motor including a feedback signal to said servo amplifier for establishing stablized motor commutation.

21. The apparatus of claim 16 wherein said processor is programmed to store the time of each inoperative period and the distance set in said web length input for the next length input for the next indexing cycle during a preceding indexing movement of said rolls.

22. The apparatus of claim 21 wherein said web includes control marks for positioning of said web with respect to said seal bar unit, and said apparatus including a photoscanner for detecting the movement of said mark to said feed rolls, said processor being programmed to slowly drive said motor at a constant speed and stop said motor in response to the output of said photoscanner indicating alignment with one of said marks on said web.

23. The apparatus of claim 21 including programmed means to slightly change the length of every other movement of said web from the length of web established by said web length means.

24. The apparatus of claim 21 wherein said motor includes a fault detection means monitoring a variation between said programmed motion profile and said actual motion profile during the movement of said web and establishing an output signal in the presence of a preselected variation.

25. The apparatus of claim 24 wherein said motor means is a brushless commutating servo motor directly coupled to said feed unit, a servo amplifier connects said motor to a power supply and including a feedback signal for establishing stablized motor commutation, including means responsive to said output signal of said fault detection means to disable said servo amplifier.

26. A web processing apparatus for moving a continuous web through a work station, comprising a work unit, an operating cycle time including an inoperative dwell period and a work period, said work period being of an adjustable work length time within said cycle time and establishing a related adjustable dwell length time, web moving means coupled to support and move said web and including a stop position supporting said web in said work unit during said work period and a driving position transporting said web through said work unit during said dwell period, an electrical motor means coupled to said web moving means and holding said web stationary and rapidly accelerating said web moving means from a reference position for moving said web into said work unit, control means including signal means to energize said motor means with controlled acceleration and deceleration within said dwell period with a programmed motion profile and establishing controlled acceleration and deceleration of said motor means to move said web during the adjustable dwell length time, said control means including first input means including a bag length input and second input means for said adjustable dwell length time to establish said programmed motion profile for continuously moving said web from the beginning to the end of said dwell length time and said control means monitoring the movement of said web and varying said motor means in accordance with said motion profile to maintain said motion profile in accordance with said bag length input and said dwell length time input.

* * * * *